United States Patent
Showalter et al.

(10) Patent No.: US 10,348,800 B2
(45) Date of Patent: Jul. 9, 2019

(54) INVOCATION CONTEXT CACHING

(71) Applicant: Microsoft Technology Licensing, LLC, Redmond, WA (US)

(72) Inventors: Timothy Jack Showalter, Newark, CA (US); Rongsheng Liang, Cupertino, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 56 days.

(21) Appl. No.: 15/427,322

(22) Filed: Feb. 8, 2017

(65) Prior Publication Data

US 2018/0227385 A1 Aug. 9, 2018

(51) Int. Cl.
| | |
|---|---|
| *H04L 29/08* | (2006.01) |
| *H04L 12/721* | (2013.01) |
| *H04L 12/733* | (2013.01) |
| *H04L 12/725* | (2013.01) |
| *G06F 15/173* | (2006.01) |

(52) U.S. Cl.
CPC ............ *H04L 67/02* (2013.01); *H04L 45/306* (2013.01); *H04L 67/327* (2013.01)

(58) Field of Classification Search
USPC ........................................ 709/203, 229, 249
See application file for complete search history.

(56) References Cited

U.S. PATENT DOCUMENTS

| | | | | |
|---|---|---|---|---|
| 6,823,391 | B1 * | 11/2004 | Deen ...................... | H04L 61/301 709/229 |
| 7,643,468 | B1 * | 1/2010 | Arregoces ............. | H04L 12/462 370/351 |
| 8,583,763 | B1 * | 11/2013 | Kim ........................ | G06F 21/53 709/218 |
| 9,094,464 | B1 * | 7/2015 | Scharber ............... | H04L 45/026 |
| 9,379,903 | B1 * | 6/2016 | McAlister ............. | H04L 41/042 |
| 2009/0019535 | A1 * | 1/2009 | Mishra ................... | G06Q 10/00 726/12 |
| 2013/0054684 | A1 * | 2/2013 | Brazier ................... | G06Q 10/02 709/203 |
| 2016/0142475 | A1 * | 5/2016 | Kathuria ............. | H04L 67/1008 709/203 |
| 2017/0262373 | A1 * | 9/2017 | Bedi .................... | G06F 16/9574 |
| 2018/0139269 | A1 * | 5/2018 | Wu ........................ | H04L 67/101 |
| 2018/0139273 | A1 * | 5/2018 | Liu ...................... | H04L 67/1025 |

* cited by examiner

*Primary Examiner* — Jude Jean Gilles (74) *Attorney, Agent, or Firm* — Schwegman Lundberg & Woessner, P.A.

(57) ABSTRACT

Disclosed are systems, methods, and computer-readable storage media for caching routing data in a request to provide a service. A front-end server located at a first datacenter receives a request for a service, with the request originating from a client device. In response to receiving the request, the front-end server queries a routing database for routing data identifying a location of one or more computing devices to fulfill the request. The front-end server receives the routing data from the routing database and transmits, based on the routing data received from the routing database, a first subsequent request to a front-end server located at a second datacenter. The subsequent request is appended with the routing data and the front-end server located at the second datacenter utilizes the routing data included in the subsequent request to fulfill the request received from the client device.

20 Claims, 7 Drawing Sheets

INVOCATION CONTEXT CACHING

TECHNICAL FIELD

An embodiment of the present subject matter relates generally to Internet accessible services and, more specifically, to caching routing data in a request to provide a service.

BACKGROUND

Internet or network based data and services may provide multiple data or service centers that are geographically diverse. Various mechanisms exist for routing a request to a specific location for data and services. For example, a front-end server can utilize a routing database to properly route a request to an appropriate datacenter and/or back-end server to provide a requested service. To fulfill a request, servers (e.g., front-end servers and/or back-end servers) again communicate with the routing database to revalidate the location of desired data. Each query results in a separate network request being transmitted to the routing database. These repetitive network requests are both costly and redundant.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for caching routing data in a request to provide a service (e.g., application service). Network based services may utilize multiple data or service centers that are geographically diverse. A routing database maintains data identifying network locations for providing requested services. The routing database can also include data identifying access routes (e.g., network/next hop associations) to reach a particular network destination.

When a node in a network needs to send a data packet to another node, the node first queries the routing database for the location of the desired node as well as an access route for reaching the desired node. For example, a front-end server that receives a request for a service can query the routing database for routing data identifying the network location of one or more computing devices to fulfill the request. The front-end server can utilize the returned routing data to transmit a subsequent request to the appropriate network location, such as a front-end server at a different database or a back-end server that can service the request.

In traditional systems, each downstream request may cause the requesting node to again query the routing database for the routing data. For example, a service may need to call other services, resulting in redundant network requests to the routing database. To reduce the number of redundant calls to the routing database, a computing node can append the routing data to a request, which can then be used by the receiving node. For example, after receiving the routing data from the routing database, a front-end server can append the routing data to a request that is then transmitted to a front-end server at a different database or a back-end server. The receiving node (e.g., front-end server or back-end server) can use the routing data appended to the message to transmit subsequent requests without having to query the routing database. The routing data can be appended to each subsequent request, thereby providing the routing data to each receiving node and eliminating subsequent network requests to the routing database.

In some embodiments, the routing data can be appended to a header of a request. For example, the routing data can be appended to a Hypertext Transfer Protocol (HTTP) header. A receiving node can access the routing data from the HTTP header, which can be used to transmit subsequent requests without having to query the routing database.

In some embodiments, the routing database can route requests to a specific data center or server based on a requesting user's entity status. This concept may be referred to herein as "entity-based routing," for simplicity. In some embodiments, services and data can be made available to users via one or more servers that can reside in one or more distinct data centers. Some common or public data may reside on a point of presence (POP) server that may or may not be co-located with a data center. A provider may have more POP servers than data centers. A user may be a stand-alone entity having access to only the user's personal data or services. A user may be a part of an enterprise, account, or company to use data and services shared by other members of that entity. In some cases, members of an entity may share a subset of data and services. For instance, a network provider may provide multiple services to an entity. Members of the entity may be conceptually segregated into sub-entities, where each sub-entity utilizes a provider's service and shares data with other members of the sub-entity. Often entities contract with the provider for multiple services, via an "account," where different services may be accessible by different members of their team or enterprise. A user may be a member of multiple entities and sub-entities.

Figure 1:
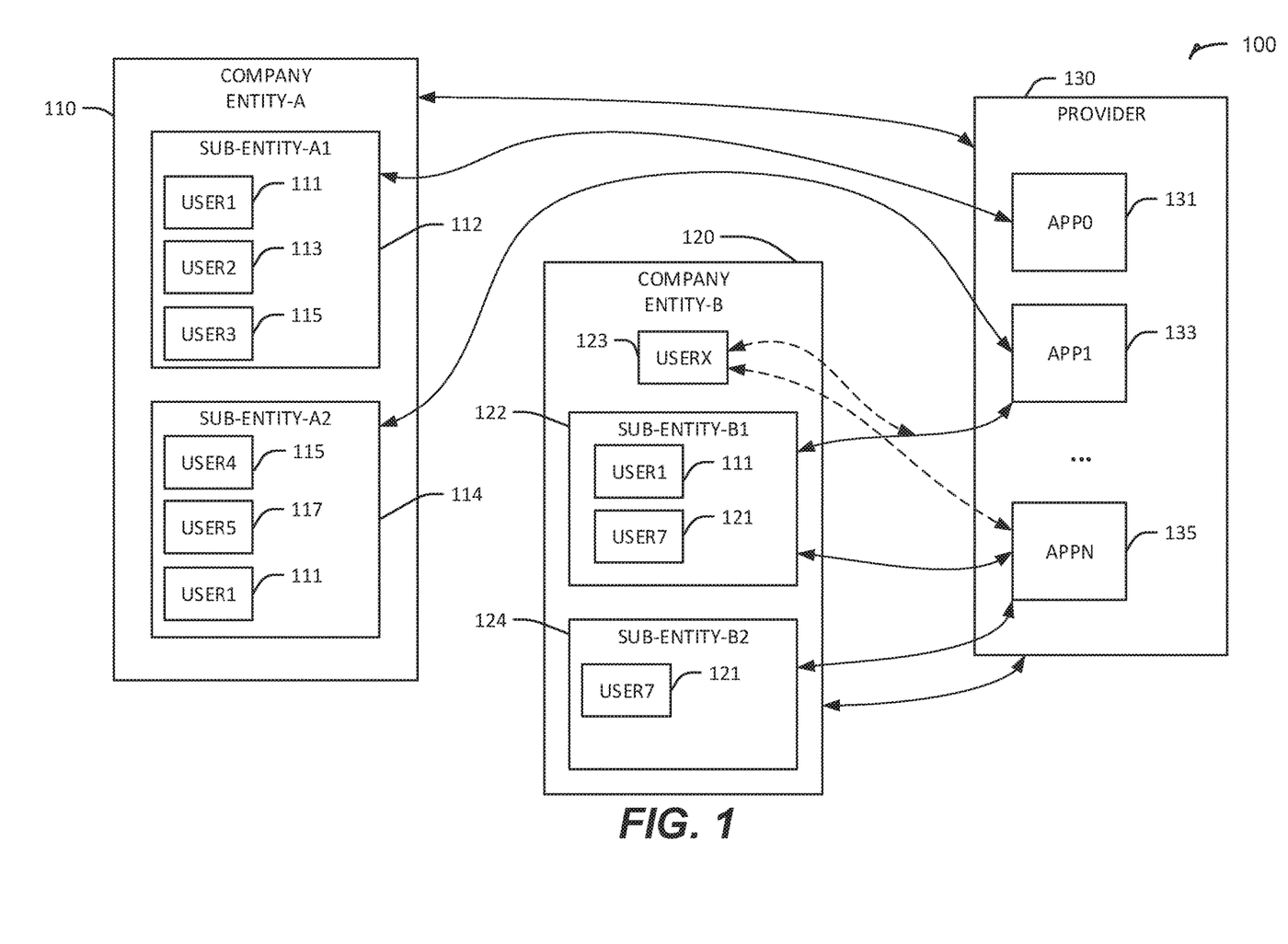
FIG. 1 shows a block diagram illustrating a relationship among users, entities, and providers, according to an embodiment.

FIG. 1 one shows an example entity-based paradigm 100. In an example, provider 130 may provide applications, or services and data, 131, 133, and 135. Users may require access to the applications, where the users may be associated with companies 110 and 120. In an example, company 110 is defined as Entity-A, and company 120 is defined as Entity-B. Entity-A 110 may require the use of applications and data APP0 131 and APP1 133. But not all users associated with Entity-A may require access, or be permitted access, to both APP0 131 and APP1 133. In an example, access by Entity-A 110 is divided into sub-entities, Sub-Entity-A1 112 and Sub-Entity-A2 114. In this example, Sub-Entity-A1 112 has user1 111, user2 113 and user3 115 as members. Sub-Entity-A2 114 has user1 111, user4 115 and user5 117 as members. In this example, access by Entity-B 120 is divided into sub-entities, Sub-Entity-B1 122 and Sub-Entity-B2 124. In this example, Sub-Entity-B1 122 has user1 111 and user7 121 as members. Sub-Entity-B2 124 has user7 121 as its only member. It should be noted that user1 111 is a member of more than one entity. In an embodiment, user1 111 may be a contractor to both entities 110 and 120 or an employee of both entities. Other relationships between user1 111 and the individual entities may exist. In this example, userx 123 may be associated with Entity-B 120 as a whole, similar to a super user, and have access to all applications for which Entity-B 120 has contracted with Provider 130 (APP0 133 and APPN 135).

In an embodiment, Entity-A 110 and Entity-B 120 contract with Provider 130 for access to various applications and services. The contracts may provide access requirement information regarding users and sub-entities. For instance, at the time of contract, Entity-A 110 may define that APP0 and APP1 are required, but that a different set of users will have access. Thus, sub-entities A1 112 and A2 114 are defined. In an alternative embodiment, Provider 130 may define the sub-entities dynamically, based on a number of variables. In an example, the sub-entities may map to individual application usage. In another embodiment, the sub-entities may be defined based on application, access-level (i.e., read/write vs. read/write/delete vs. read-only, etc.). In another embodiment, the sub-entities may include the user or entity's geographic location, as a parameter. In an embodiment, a contract ID associated with the user and associated entity may be stored in a cookie. This cookie may be retrieved by the routing service to assist in routing user/entity service requests. A user may be associated with multiple cookies based on which services and data are requested at a given time (e.g., a user will have a different cookie for each entity or sub-entity to which the user has membership). While the term sub-entity has been used in this discussion, for illustrative purposes, the term "entity" may be used synonymously, for simplicity.

Some providers mirror their applications, or services, and data at multiple locations or data centers. This provides proximity efficiency for users who are able to access the service or data at a proximate location. However, when multiple users share data or a service, they may not be co-located. For instance, if an entity has users located in disperse geographical areas, existing routing systems might route individual user access to a different data center, most proximate to that user's location.

Figure 2:
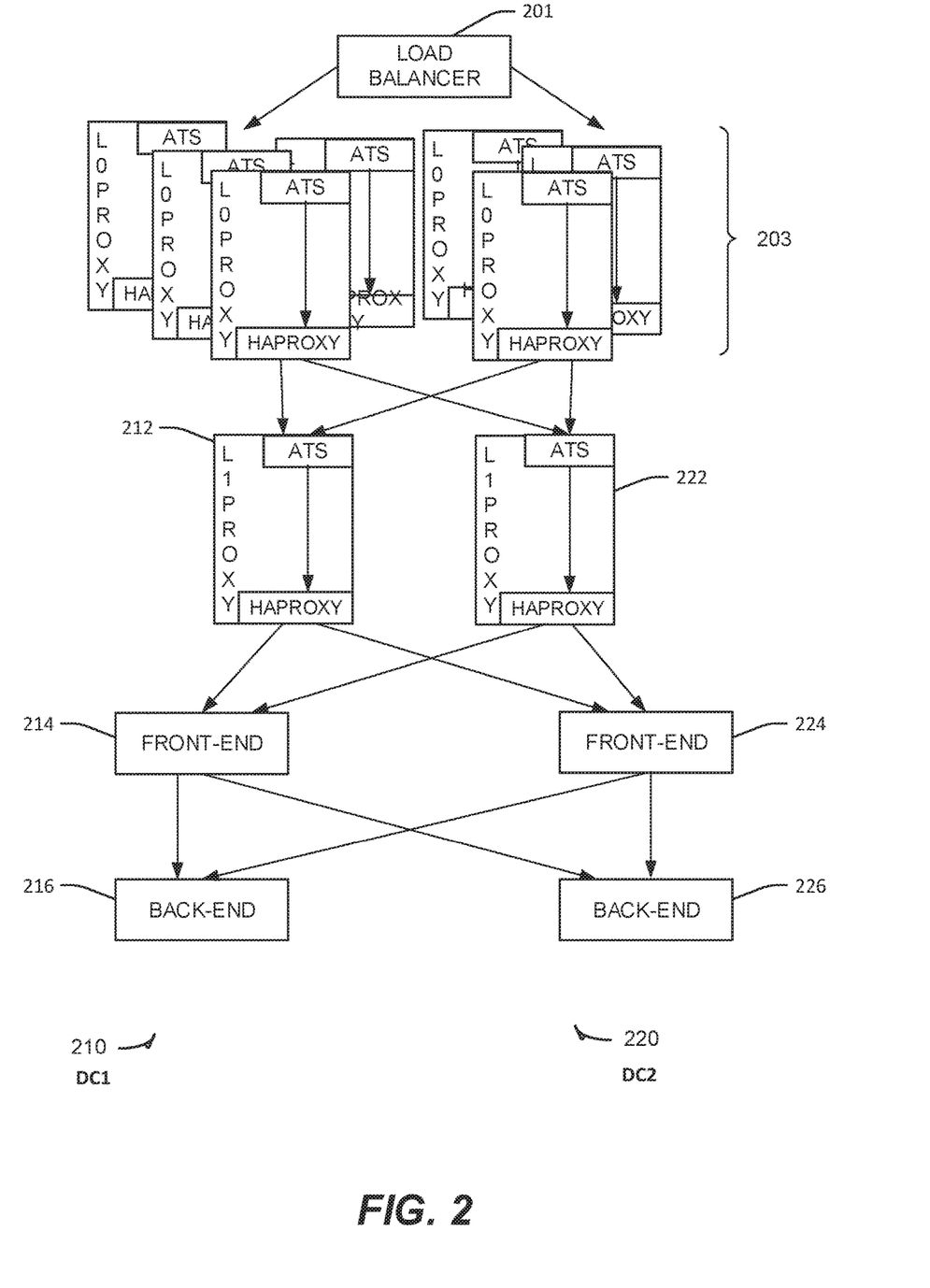
FIG. 2 shows a block diagram illustrating proxy based network routing.

FIG. 2 is a block diagram illustrating a simple proxy routing scheme. A user may request a service from a provider by attempting open access to, or logging on to, a domain accessible via a Uniform Resource Locator (URL) on the Internet. The provider may have several POP servers 203 and a number of data centers available. Thus, the provider may want to balance the load of Internet traffic at 201. The load balance may merely use a round robin technique for Internet requests or use a more complicated algorithm that takes proximity or application hosting into account. The POP servers 203 may host public or commonly used data such as news images at the POP server level for ease of retrieval. The L0 proxy server may use an Apache Traffic Server (ATS) component to implement the proxy server. The L0 proxy server may also include a high availability (HA) proxy component to load balance the TCP service.

When a user requests access to a specific application, the request is often sent from the POP server using an L0 proxy server 203 to an L1 proxy server 212, 222 at a data center. The data center (e.g., DC1 210 or DC2 220) may be selected by geography or other selection means. In some cases, an application may be available only from a specific data center. The L1 proxy server forwards the service request to a front-end server 214 or 224. In an example, a request from a user is forwarded from L1 212 to front-end 214 in DC1 210. If the data is hosted at a different data center DC2 220, then the front-end 214 can communicate with back-end 226 in DC2 to service the request. Even if the request seems like a simple one, the front-end and back-end may transmit multiple back and forth messages to complete the request. In this example, since front-end 214 and back-end 226 are in two geographically disperse data centers, this communication may introduce delays and inefficiencies. A more efficient traffic routing would have front-end 214 communicate mostly with back-end 216, and for front-end 224 to communicate mostly with back-end 226, thus keeping traffic within the same data center for a single request. This routing may be impossible when data is not hosted in the data center that tries to service the initial user request. It may be impractical for a request to be completely serviced in the same data center for other load balancing reasons, as well.

It will be understood that users requesting access to the same data may themselves be geographically disperse and initially routed to different data centers to service similar requests. It may be more efficient if users required to share data can share the data at the same location or data center. This minimizes network hopping to access, retrieve, and update the most recent data. It will be understood that even when multiple data centers mirror data and services that there will be delays in synchronizing the data across data centers as users update or modify the data at one center. Thus, delays are minimized when users access data from the same data center.

Figure 3:
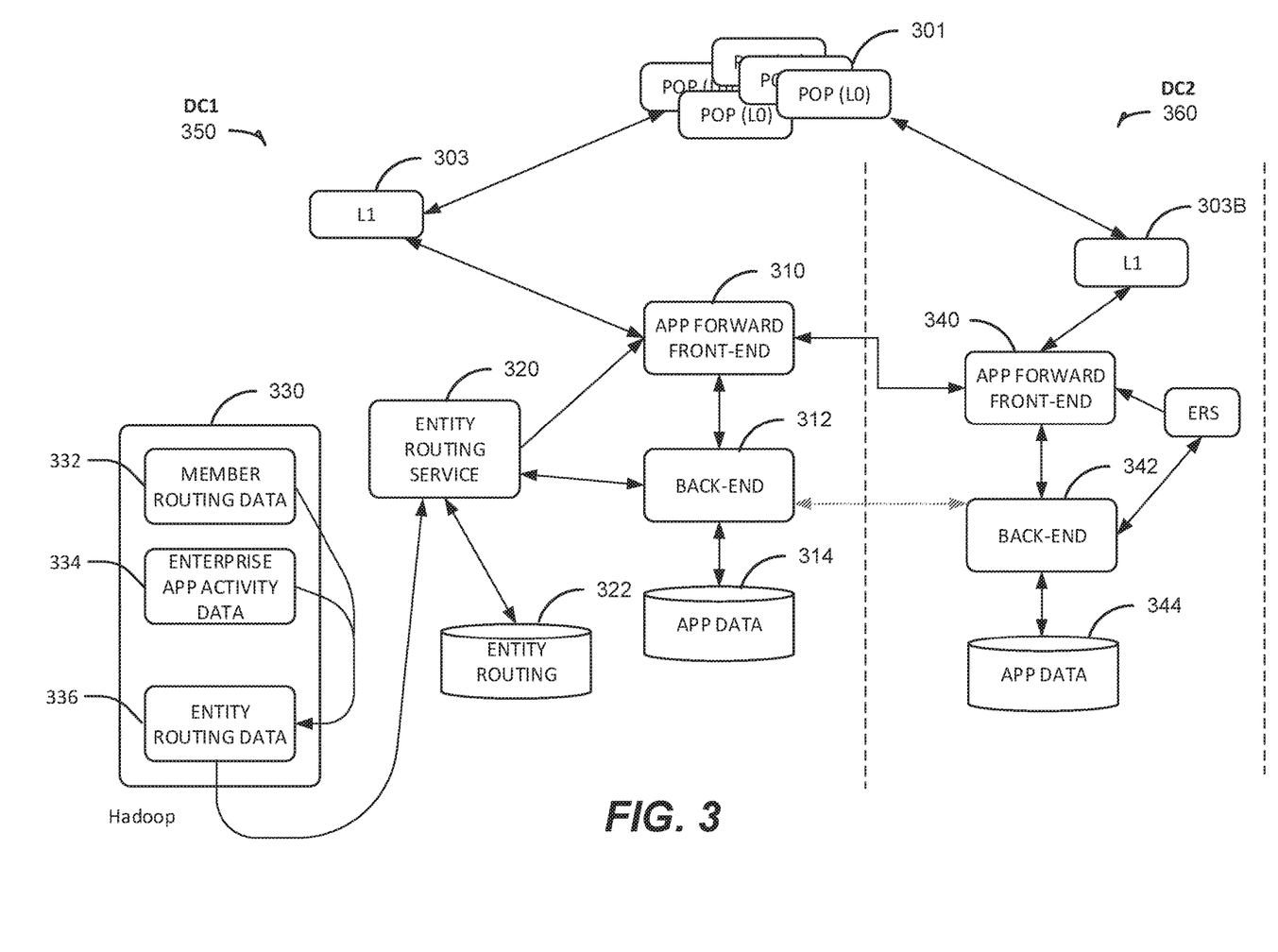
FIG. 3 shows a block diagram illustrating a routing service for caching routing data in a message, according to some embodiments.

FIG. 3 is a block diagram illustrating a routing service for caching routing data in a message, according to some embodiments. In an example, a provider may utilize multiple data centers, DC1 350 and DC2 360, to provide data and services. It will be understood that more than two data centers may be available and that two data centers are illustrated for ease of explanation.

DC1 350 and DC2 360 can communicate with POP servers 301 to receive an initial service request from a user and route the request appropriately. A user can utilize a client device (not shown) such as a laptop computer, smart phone, and the like, to request data or services from a provider. For example, the user can utilize a client-side application (e.g., web browser or service specific application) installed on the client device to navigate directly to a URL, or log into the service, causing the user's client device to transmit the service request to POP servers 301.

The service request can be connected to a data center which is geographical proximate to the user's location. As an example, a user's request may be routed to the front-end architecture of the data center, perhaps to request a user profile page. The service returning this page must ultimately produce Hypertext Markup Language (HTML), but the internal computations may use any convenient internal format. In an embodiment, internal components return JSON (JavaScript Object Notation) data for different sections of the page, and then use an additional program to turn JSON into HTML.

A service may asynchronously fetch and aggregate the data for a requested page. The server may produce HTML from several JSON data using a template. This technique is widely-known as "server-side rendering." Alternatively, templates may render the HTML based on JSON data within the user's browser. Instead of using JSPs (Java Server Pages) on the server and returning HTML directly to the browser, the Profile web app may serve the data for the page as JSON, then have the browser produce HTML from the JSON and JavaScript code. This technique is widely-known and called "client side rendering." However, while this technique may make page rendering more efficient for a user, for many applications the user may still require access to data that may be hosted in a data center to which the user is not initially connected.

In an example, user1 111 may require access to data in APP0 131 which has been saved by user2 113. User2 113 may have been connected to DC1 350, which is where that data may officially be hosted at App Data store 344, for the user's entity. In some embodiments, the data may be mirrored in both DC1 350 and DC2 360 at App data stores 314 and 344. But the provider may designate DC1 350 as its primary location for the data for a given entity. If user2 113 accesses the service but is connected with DC2 360, inefficiencies or incorrectness may result in passing the data back and forth between the data centers during usage. Existing systems typically route network traffic back and forth among data centers from the front-end 310 to back-end 342 or front-end 340 to back-end 312, as discussed in reference to FIG. 2. But this diagonal communication causes excess network traffic.

It should be noted that servers, elements, and components shown for DC1 350 also reside in DC2 360. Some elements may be omitted so as not to obfuscate the discussion. In an embodiment, an entity routing service 320 is utilized to route the users and entities to an appropriate data center. A data store 322 (e.g., entity routing database) maintains routing data relating to routing of a user based on the user's entity status. For example, the routing data can include data identifying network locations for providing requested services. The routing database can also include data identifying access routes (e.g., network/next hop associations) to reach a particular network destination.

A user request may be received at a POP server 301 and then routed to L1 proxy 303 in DC1 350, based on the user's geographic proximity to DC1 350. Similarly, the request might be sent to L1 proxy server 303B at DC2 360. The request at L1 303 may be forwarded to an application forward front-end 310. The front-end 310 can query entity routing service 320 to determine where to route the request to be serviced (e.g., back-end 312, back-end 342, etc.). Front-end 310 can provide entity routing service 320 with data identifying the requesting user or entity, which can be used by entity routing service 320 to determine where to route the request to be services. For example, the request can include a cookie including data identifying a requesting user or entity.

Entity routing service 320 can utilize the received data to search data store 322 to determine which back-end server (e.g., back-end 312, back-end 342, etc.) at which data center (e.g. DC1 350, DC2 360, etc.) should service the request. Entity routing service 320 can provide routing data for the identified back-end server to front-end 310, which front-end 310 can then use to properly route the request.

If the request is to be serviced in DC1 350 (e.g., by back-end 312), front-end 310 can transmit a subsequent request to back-end 312 to service the request. Back-end 312 can then gather data from application data store 314 to service the request. Alternatively, if entity routing service 320 determines the request is to be serviced in DC2 360, front-end 310 can transmit a subsequent request to front-end 340 in DC2 360. Front-end 340 may then transmit additional subsequent requests to back-end servers within DC2 360 (e.g., back-end 342), for servicing.

Subsequent downstream requests can result in redundant network requests to entity routing service 320 to revalidate the location of data. For example, prior to communicating with application data store 314 to request application data, back-end 312 may query entity routing service 320 to confirm the location of the application data. Likewise back-end 342 may query entity routing service 320 to confirm the location of application data prior to requesting the application data from application data store 344. To reduce the number of redundant network requests, the routing data received from entity routing service 320 can be cached in a request for use by the receiving node. For example, in response to receiving routing data from entity routing service 320 indicating that the request should be serviced at DC2 360, front-end 310 can append the routing data to a subsequent request sent to front-end 340.

Front-end 340 can utilize the routing data appended to the message to service the request without having to again query entity routing service 320. For example, front-end 340 can utilize the routing data to transmit a subsequent request to back-end 342, without the need to query entity routing service 320. The routing data can be appended to subsequent requests to reduce further network requests to entity routing service 320. For example, front-end 340 can append the routing data to the subsequent request that is transmitted to back-end 342. Back-end 342 can use the routing data appended to the subsequent request to service the request without having to query entity routing service 320. For example, back-end 342 can use the appended routing data to validate the location of data in application data store 344 and then communicate with application data store 344 to retrieve the data.

In some embodiments, the routing data can be appended to a header of the message. For example, the routing data can be appended to an HTTP header of the message. A receiving node (e.g., back-end 342) can gather the routing data from the header of the message.

A provider may change the routing information in data store 322 on a periodic basis dependent on factors such as changes in contracting entities, network traffic, bandwidth, load at the data centers, and so forth. In an embodiment, a Hadoop or Apache Traffic Server or agent 330 may be executed to retrieve and analyze load balancing, network, and entity usages, to be discussed more fully below. The agent 330 may retrieve member routing data 332 to determine where entities and users are (geographically), which users or entities request services more often, and the like, and collects data on specific member routing to and through the providers network or POP and data centers. The agent may also utilize an enterprise application activity service to identify which enterprise applications are more heavily used, by which users and entities, and from which geographic areas, and collects this data into the enterprise application activity data store 334. The results from these processes in 332 and 334 may be aggregated and analyzed by an entity routing process 336, which feeds the results of its analysis to the entity routing service 320. If changes in routing need to be implemented, based on this analysis, the new routing associations are stored in entity routing data store 322.

In prior systems, making changes to routing relationships was a manual task and required several levels of changes, including reconfiguration of front-end and back-end processes. These tasks could take hours to implement, causing significant downtime in user access to application services. In embodiments described herein, changing routing relationships using the entity routing service and entity routing database may reduce the downtime to a matter of minutes, rather than hours. The traffic analysis, member geographical preferences, and load balancing are initiated and run by agents during maintenance events. Data and entity routing information is typically mirrored across data centers. An application service may also be available at each data center where members of the same entity will be routed to the same data center for processing. When the load balancing analysis indicates that an entity should be hosted at a different data center to obtain a more even load distribution, the entity routing data base is updated accordingly. Once the data in the application data stores and entity routing databases are propagated across data centers and guaranteed to be consistent and up to date, new user requests for the application service are routed to the hosting data center for the entity.

Personal data routing may be a solution for some users. For example, each user's address book data may be replicated in two different data centers but not all of the data centers. Read/write access for a user may be routed to only one data center. The entity routing service 320 may route a user to a different data center based on which application that user is accessing. A user, or member, may have specific routing data stored as member routing data. The user's routing data may define which data center should be accessed based on various member parameters, for instance geo location, application access, or the users' entity or sub-entity status as described in FIG. 1. The routing for a specific entity may be stored at 322. So, when a user accesses data or a service where data is shared among team members, routing may be based on the entity specifics rather than the data specifics. For instance, if a user is accessing an individual profile, that user may be routed based only on member routing data. But when the same user accesses a service shared with entity team members, the access may be routed based on the entity routing data in 322.

Figure 4:
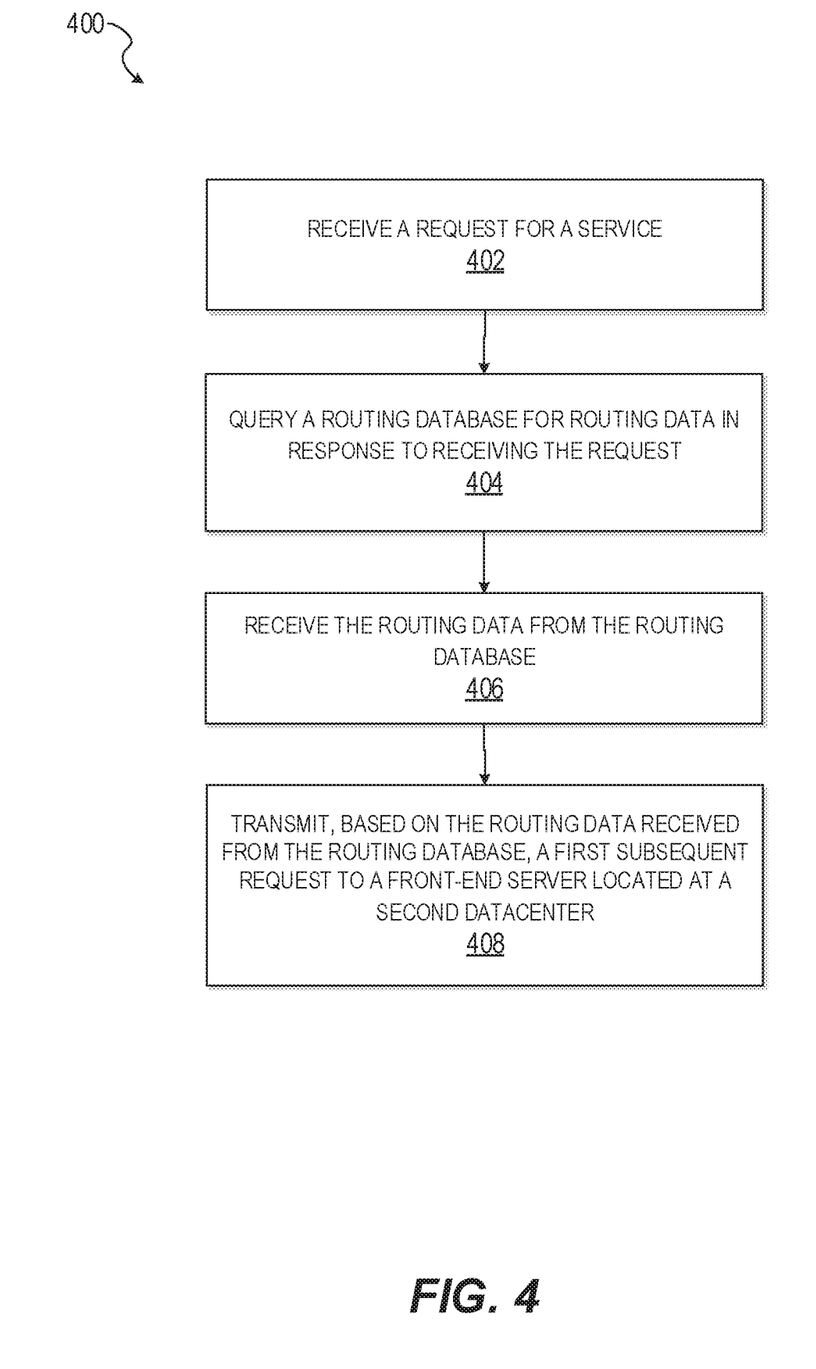
FIG. 4 shows an example method of a front-end server caching routing data in a message, according to an embodiment.

FIG. 4 shows an example method 400 of a front-end server caching routing data in a message. It should be understood that there can be additional, fewer, or alternative steps performed in similar or alternative orders, or in parallel, within the scope of the various embodiments unless otherwise stated.

At operation 402, a front-end server receives a request for a service. The front-end server can be located at a first datacenter. The request can have originated from a client device. For example, a user of the client device can use a client-side application (e.g., web browser or service specific application) installed on the client device to navigate directly to a URL, or log into the service, causing the user's client device to transmit the service request. The request can be for any type of service. For example, the request can be for a user's social networking profile page.

At operation 404, the front-end server queries a routing database for routing data in response to receiving the request. The routing data can identify a location of one or more computing devices to fulfill the request. The routing database maintains data identifying network locations for providing requested services. The routing database can also include data identifying access routes (e.g., network/next hop associations) to reach a particular network destination.

Querying the routing database can comprise the front-end server transmitting, to the routing database, data identifying a user associated with the request. For example, the data identifying the user can be received as a data cookie included in the request originating from the client device.

The routing database can use the data identifying the user to determine which computing devices (e.g., back-end servers) should service the request and gather corresponding routing data. In some embodiments, the routing database can route requests to a specific data center or server based on a requesting user's entity status (e.g., entity based routing). For example, the routing database can store entity routing information identifying relationships amongst a plurality of entities and a plurality of data centers, as well as information identifying access routes for requested services based on the entity routing information.

At operation 406, the front-end server receives the routing data from the routing database.

At operation 408, the front-end server transmits, based on the routing data received from the routing database, a first subsequent request to a front-end server located at a second datacenter. The subsequent request can be appended with the routing data. For example, the routing data can be appended to an HTTP header of the first subsequent request. The front-end service located at the second datacenter can then utilize the routing data included in the subsequent request to fulfill the request received from the client device.

Figure 5:
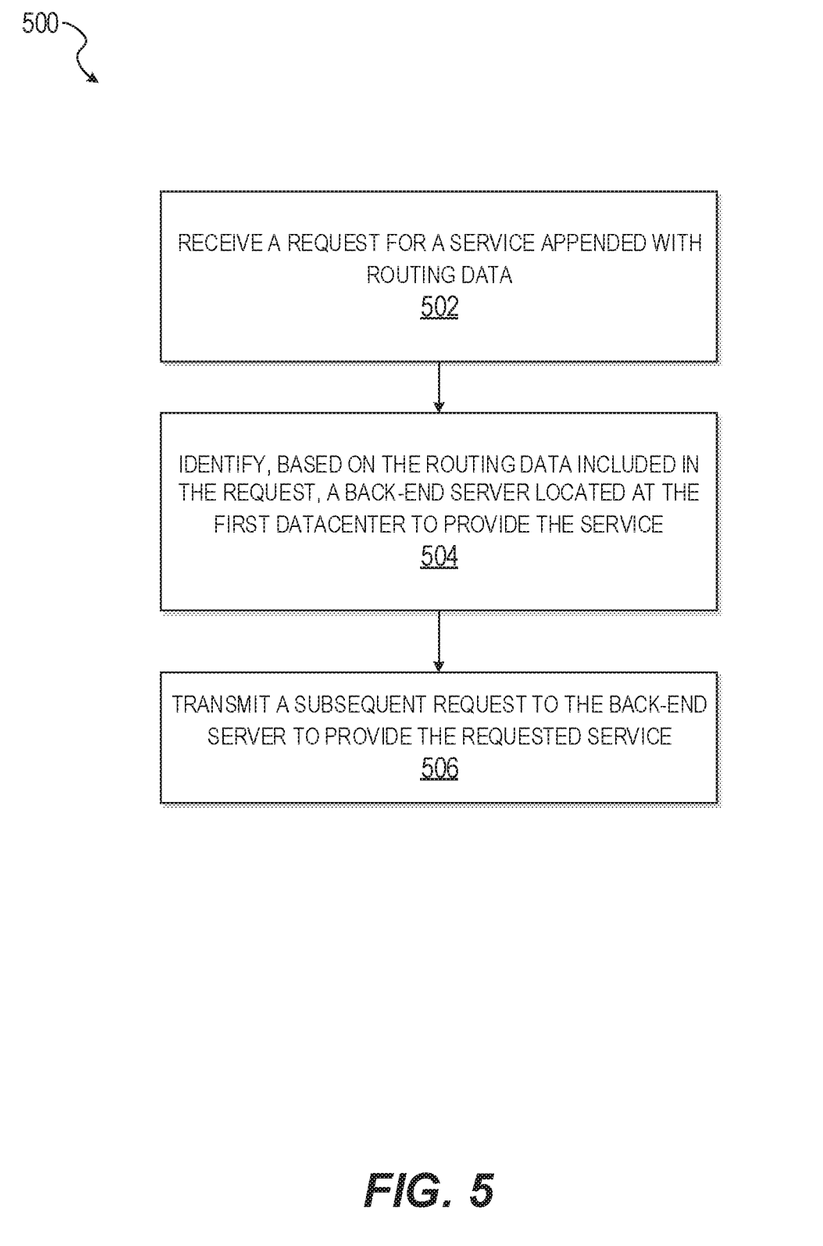
FIG. 5 shows an example method of a front-end server receiving a message appended with routing data, according to an embodiment.

FIG. 5 shows an example method 500 of a front-end server receiving a message appended with routing data. It should be understood that there can be additional, fewer, or alternative steps performed in similar or alternative orders, or in parallel, within the scope of the various embodiments unless otherwise stated.

At operation 502, the front-end server receives a request for a service appended with routing data. The front-end server can be located at a first datacenter. The received request can be a subsequent request transmitted by a front-end server located at a second datacenter, such as the subsequent request described at operation 408 in FIG. 4. For example, the request can be transmitted in response to the front-end server at the second datacenter receiving a request for a service originating from a client device. In response to receiving the request for the service, the front-end server at the second datacenter can query a routing database for the routing data.

At operation 504, the front-end server identifies, based on the routing data included in the request, a back-end server located at the first datacenter to provide the service. The routing data can be appended to an HTTP header of the request. The routing data included in the request can allow the front-end server to identify the back-end server without having to query the routing database.

At operation 506, the front-end server transmits a subsequent request to the back-end server to provide the requested service. The subsequent request can be appended with the routing date, which can be used by the back-end server to provide the requested service.

Figure 6:
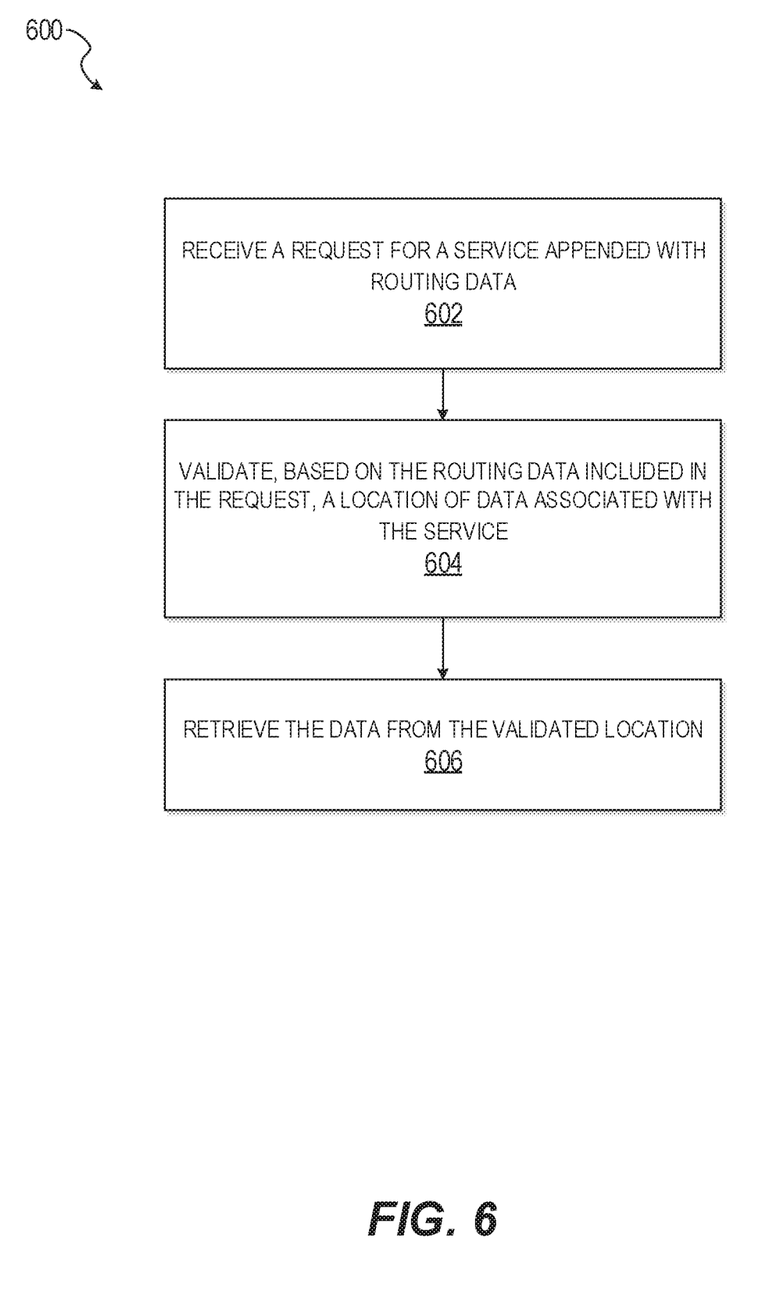
FIG. 6 shows an example method of a back-end server receiving a message appended with routing data, according to an embodiment.

FIG. 6 shows an example method 600 of a back-end server receiving a message appended with routing data. It should be understood that there can be additional, fewer, or alternative steps performed in similar or alternative orders, or in parallel, within the scope of the various embodiments unless otherwise stated.

At operation 602, the back-end server receives a request for a service appended with routing data. The received request can be a subsequent request transmitted by a front-end server, such as the subsequent request described at operation 506 in FIG. 5. The routing data can be appended to an HTTP header of the request.

At operation 604, the back-end server validates, based on the routing data included in the request, a location of data associated with the service. The routing data included in the request can allow the back-end server to validate the location of the data without having to query the routing database.

At operation 606, the back-end server retrieves the data from the validated location. For example, the back-end server can retrieve the data from an application data store.

Figure 7:
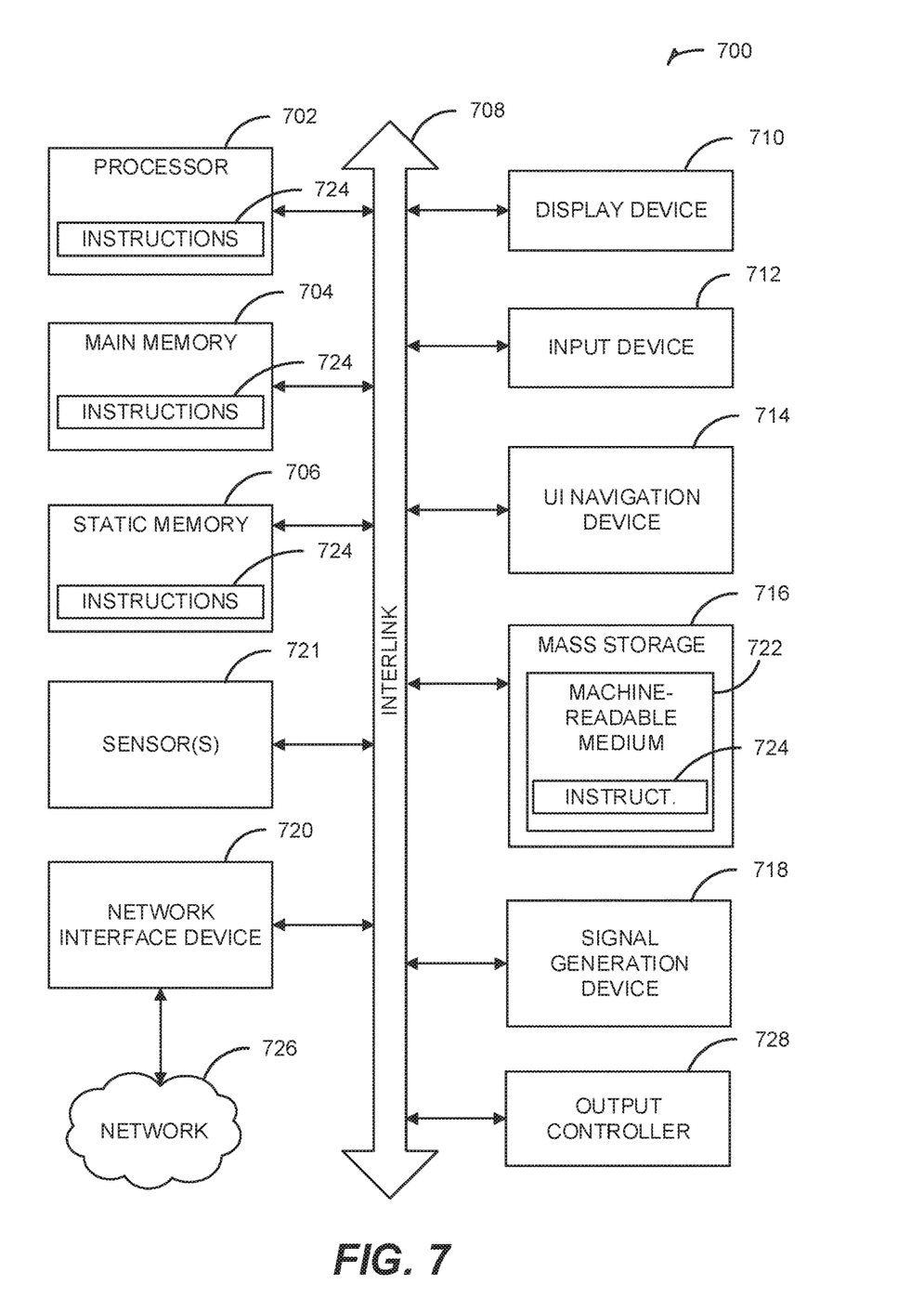
FIG. 7 shows a block diagram illustrating an example of a machine upon which one or more embodiments may be implemented

FIG. 7 illustrates a block diagram of an example machine 700 upon which any one or more of the techniques (e.g., methodologies) discussed herein may perform. In alternative embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environment. The machine 700 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant particles having mass, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a display unit 710, an alphanumeric input device 712 (e.g., a keyboard), and a user interface (UI) navigation device 714 (e.g., a mouse, track ball, etc.). In an example, the display unit 710, input device 712, and UI navigation device 714 may be a touch screen display. The machine 700 may additionally include a storage device (e.g., drive unit) 716, a signal generation device 718 (e.g., a speaker), a network interface device 720, and one or more sensors 721, such as a global positioning system (GPS) sensor, compass, accelerometer, or other sensor. The machine 700 may include an output controller 728, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within static memory 706, or within the hardware processor 702 during execution thereof by the machine 700. In an example, one or any combination of the hardware processor 702, the main memory 704, the static memory 706, or the storage device 716 may constitute machine readable media.

While the machine readable medium 722 is illustrated as a single medium, the term "machine readable medium" may include a single medium or multiple media (e.g., a centralized or distributed database, and/or associated caches and servers) configured to store the one or more instructions 724.

The term "machine readable medium" may include any medium that is capable of storing, encoding, or carrying instructions for execution by the machine 700 and that cause the machine 700 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device 720 utilizing any one of a number of transfer protocols (e.g., frame relay, internet protocol (IP), transmission control protocol (TCP), user datagram protocol (UDP), HTTP, etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and P2P networks, among others. In an example, the network interface device 720 may include one or more physical jacks (e.g., Ethernet, coaxial, or phone jacks) or one or more antennas to connect to the communications network 726. In an example, the network interface device 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700, and includes digital or analog communications signals or other intangible medium to facilitate communication of such software.

In an embodiment, a user or entity accesses the provided application from an instance of machine 700, via a network 726 to another instance of machine 700. It will be understood that the machine used by the entity may be different in architecture than the provider's machine(s), which are typically servers having routing capability, and within one or more data centers.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language that essentially provides a model of how designed hardware is expected to perform. Program code may be assembly or machine language, or data that may be compiled and/or interpreted. Furthermore, it is common in the art to speak of software, in one form or another, as taking an action or causing a result. Such expressions are merely a shorthand way of stating execution of program code by a processing system which causes a processor to perform an action or produce a result.

Each program may be implemented in a high level procedural or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium, that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), and the like, as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical, or other forms of propagated signals or carrier wave encoding the program code may pass, such as antennas, optical fibers, communications interfaces, and the like. Program code may be transmitted in the form of packets, serial data, parallel data, propagated signals, and so forth, and may be used in a compressed or encrypted format.

Program code may be implemented in programs executing on programmable machines such as mobile or stationary computers, PDAs, smart phones, mobile Internet devices, set top boxes, cellular telephones and pagers, consumer electronics devices (including DVD players, personal video recorders, personal video players, satellite receivers, stereo receivers, cable television (TV) receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked micro-services, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a GPU, a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic, or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such, modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A method comprising:
   receiving, by a front-end server located at a first datacenter, a request for a service, the request originating from a client device;
   in response to receiving the request, querying a routing database for routing data identifying a location of one or more computing devices to fulfill the request;
   receiving the routing data from the routing database;
   transmitting, based on the routing data received from the routing database, a first subsequent request to a front-end server located at a second datacenter, the subsequent request appended with the routing data, the front-end server located at the second datacenter utilizing the routing data included in the subsequent request to fulfill the request received from the client device.

2. The method of claim 1, wherein after receiving the first subsequent request, the front-end server located at the second datacenter:
   identifies, based on the routing data included in the first subsequent request and without querying the routing service, a first back-end server located at the second datacenter to provide the service; and
   transmits a second subsequent request to the first back-end server, the second subsequent request appended with the routing data.

3. The method of claim 2, wherein after receiving the second subsequent request, the first back-end server validates, based on the routing data included in the second subsequent request and without querying the routing service, a location of data associated with the service.

4. The method of claim 1, wherein the routing data is appended to a Hypertext Transfer Protocol (HTTP) header of the first subsequent request.

5. The method of claim 1, wherein the routing database stores:
   entity routing information identifying relationships amongst a plurality of entities and a plurality of data centers; and
   information identifying access routes for requested services based on the entity routing information.

6. The method of claim 5, wherein querying the routing database comprises:
   transmitting, to the routing database, data identifying a user associated with the request.

7. The method of claim 6, wherein the data identifying the user is a data cookie received in the request for the service.

8. A front-end server located at a first datacenter comprising:
   one or more computer processors; and
   one or more computer-readable mediums storing instructions that, when executed by the one or more computer processors, cause the front-end server to:
   receive a request for a service, the request originating from a client device;

in response to receiving the request, query a routing database for routing data identifying a location of one or more computing devices to fulfill the request;

receive the routing data from the routing database;

transmit, based on the routing data received from the routing database, a first subsequent request to a front-end server located at a second datacenter, the subsequent request appended with the routing data, the front-end server located at the second datacenter utilizing the routing data included in the subsequent request to fulfill the request received from the client device.

9. The front-end server of claim 8, wherein after receiving the first subsequent request, the front-end server located at the second datacenter:

identifies, based on the routing data included in the first subsequent request and without querying the routing service, a first back-end server located at the second datacenter to provide the service; and transmits a second subsequent request to the first back-end server, the second subsequent request appended with the routing data.

10. The front-end server of claim 9, wherein after receiving the second subsequent request, the first back-end server validates, based on the routing data included in the second subsequent request and without querying the routing service, a location of data associated with the service.

11. The front-end server of claim 8, wherein the routing data is appended to a Hypertext Transfer Protocol (HTTP) header of the first subsequent request.

12. The front-end server of claim 8, wherein the routing database stores:

entity routing information identifying relationships amongst a plurality of entities and a plurality of data centers; and information identifying access routes for requested services based on the entity routing information.

13. The front-end server of claim 12, wherein querying the routing database comprises:

transmitting, to the routing database, data identifying a user associated with the request.

14. The front-end server of claim 13, wherein the data identifying the user is a data cookie received in the request for the service.

15. A non-transitory computer-readable medium storing instructions that, when executed by one or more computer processors of a front-end server, cause the front-end server to:

receive a request for a service, the request originating from a client device;

in response to receiving the request, query a routing database for routing data identifying a location of one or more computing devices to fulfill the request;

receive the routing data from the routing database;

transmit, based on the routing data received from the routing database, a first subsequent request to a front-end server located at a second datacenter, the subsequent request appended with the routing data, the front-end server located at the second datacenter utilizing the routing data included in the subsequent request to fulfill the request received from the client device.

16. The non-transitory computer-readable medium of claim 15, wherein after receiving the first subsequent request, the front-end server located at the second datacenter:

identifies, based on the routing data included in the first subsequent request and without querying the routing service, a first back-end server located at the second datacenter to provide the service; and transmits a second subsequent request to the first back-end server, the second subsequent request appended with the routing data.

17. The non-transitory computer-readable medium of claim 16, wherein after receiving the second subsequent request, the first back-end server validates, based on the routing data included in the second subsequent request and without querying the routing service, a location of data associated with the service.

18. The non-transitory computer-readable medium of claim 15, wherein the routing data is appended to a Hypertext Transfer Protocol (HTTP) header of the first subsequent request.

19. The non-transitory computer-readable a medium of claim 15, wherein the routing database stores:

entity routing information identifying relationships amongst a plurality of entities and a plurality of data centers; and information identifying access routes for requested services based on the entity routing information.

20. The non-transitory computer-readable medium of claim 19, wherein querying the routing database comprises:

transmitting, to the routing database, data identifying a user associated with the request, the data identifying the user received as a data cookie in the request for service.

* * * * *

UNITED STATES PATENT AND TRADEMARK OFFICE
CERTIFICATE OF CORRECTION

PATENT NO. : 10,348,800 B2
APPLICATION NO. : 15/427322
DATED : July 9, 2019
INVENTOR(S) : Showalter et al.

Page 1 of 1

It is certified that error appears in the above-identified patent and that said Letters Patent is hereby corrected as shown below:

In the Claims

In Column 16, Line 35, in Claim 19, after "computer-readable", delete "a"

Signed and Sealed this
Seventeenth Day of March, 2020

Andrei Iancu
*Director of the United States Patent and Trademark Office*